March 21, 1950     R. W. HEER     2,501,332
CONVEYER SUPPORT AND TRANSPORT TRUCK
Filed April 12, 1946     3 Sheets-Sheet 1
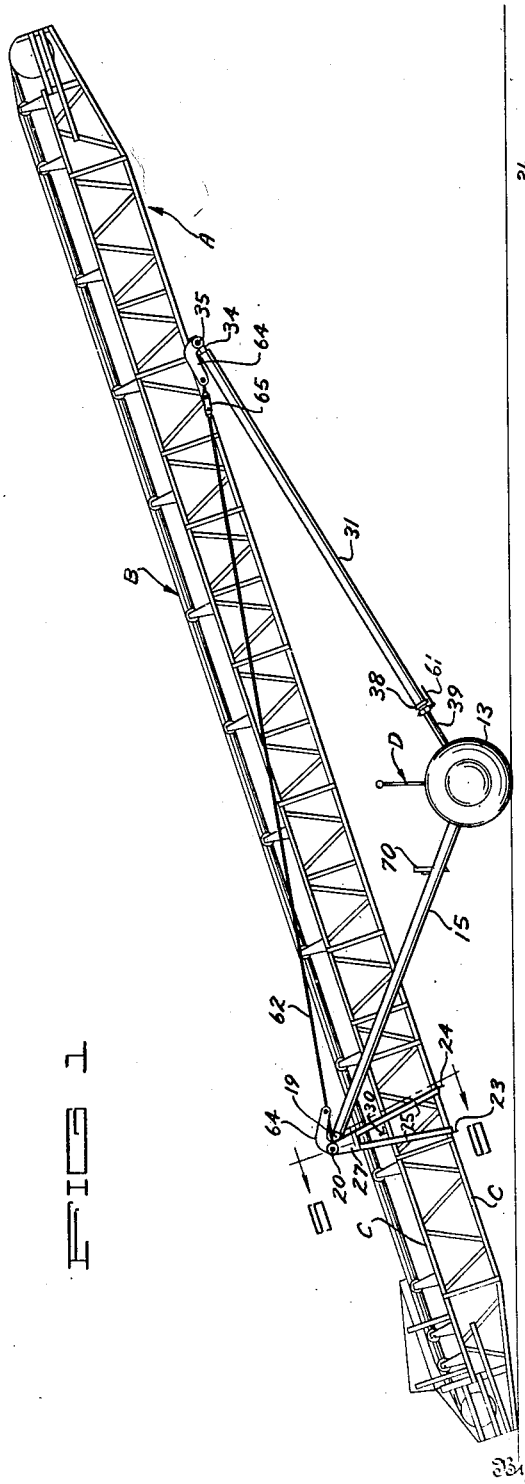
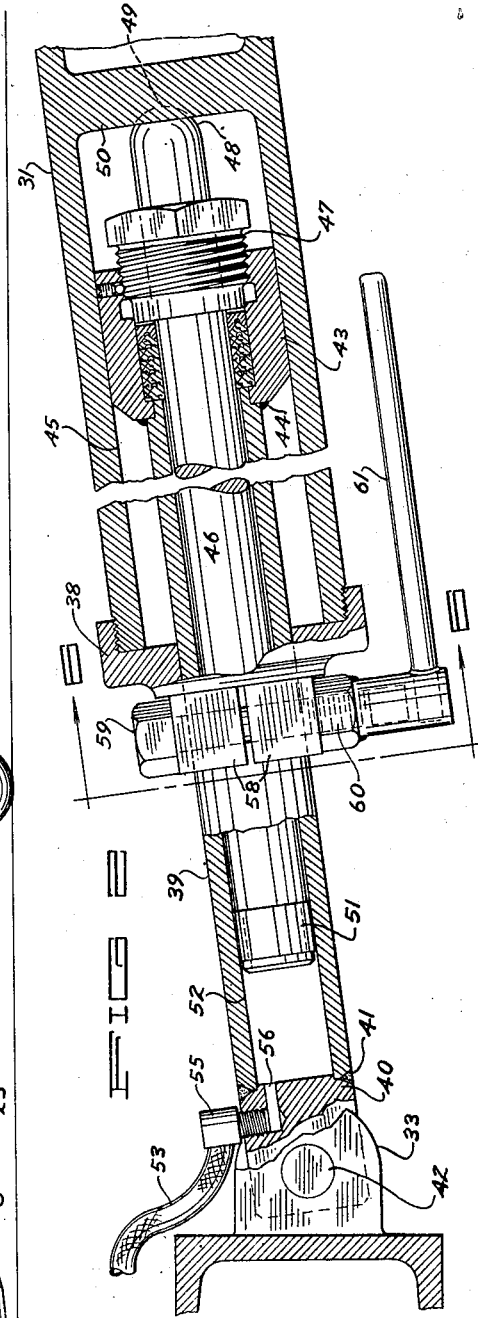
Inventor
RALPH W. HEER
By Carlsen + Hazle
Attorneys

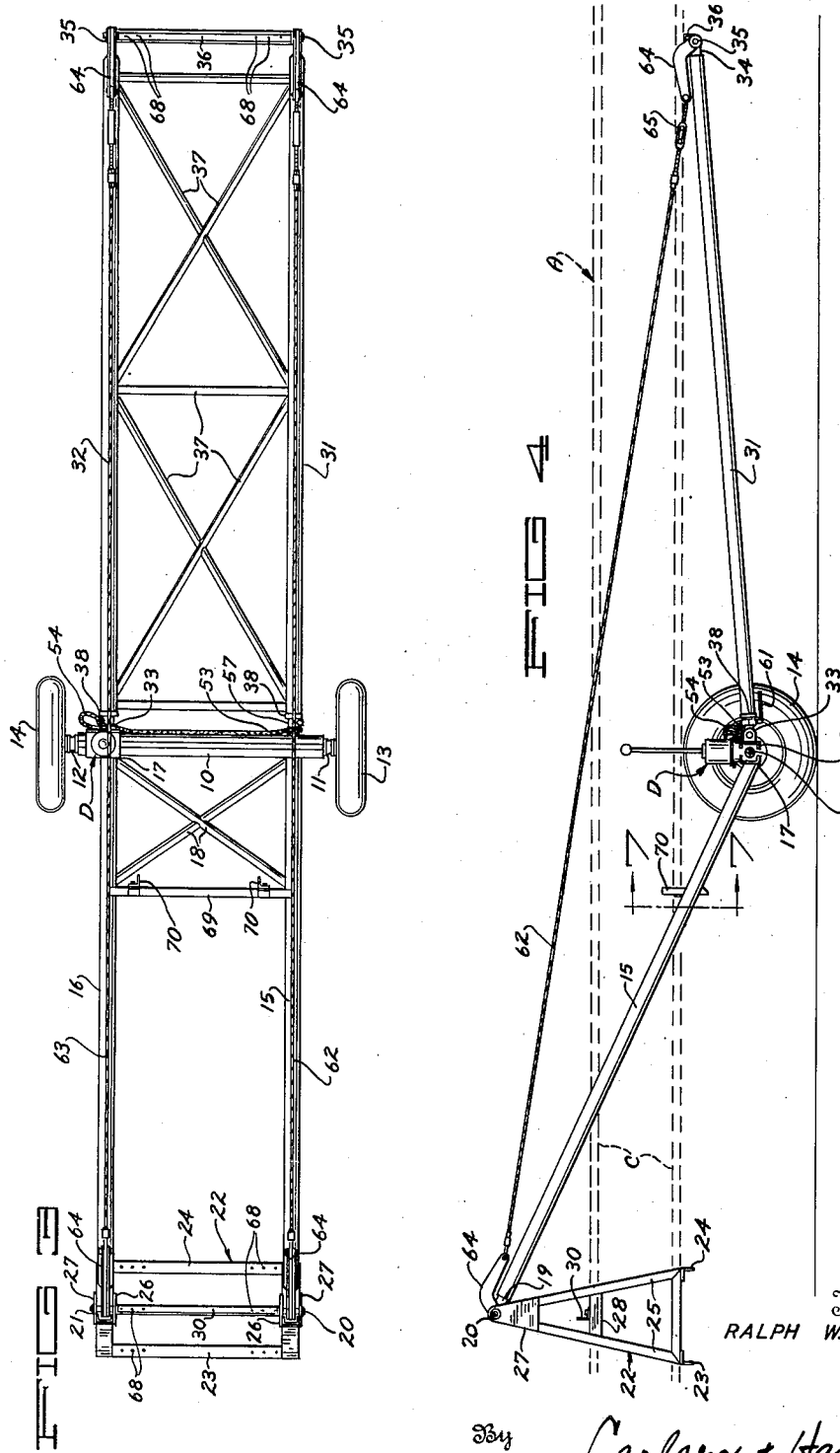

March 21, 1950     R. W. HEER     2,501,332
CONVEYER SUPPORT AND TRANSPORT TRUCK
Filed April 12, 1946     3 Sheets-Sheet 3
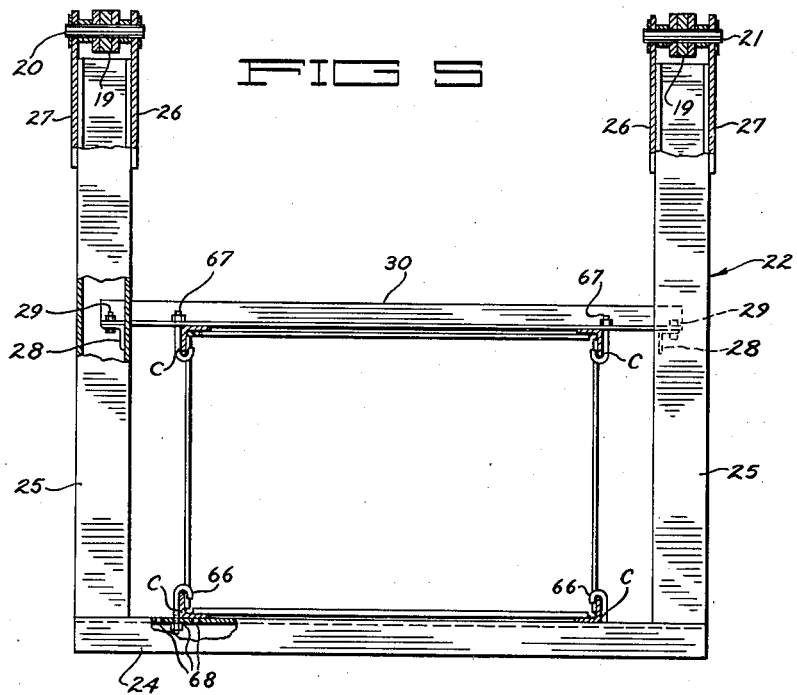
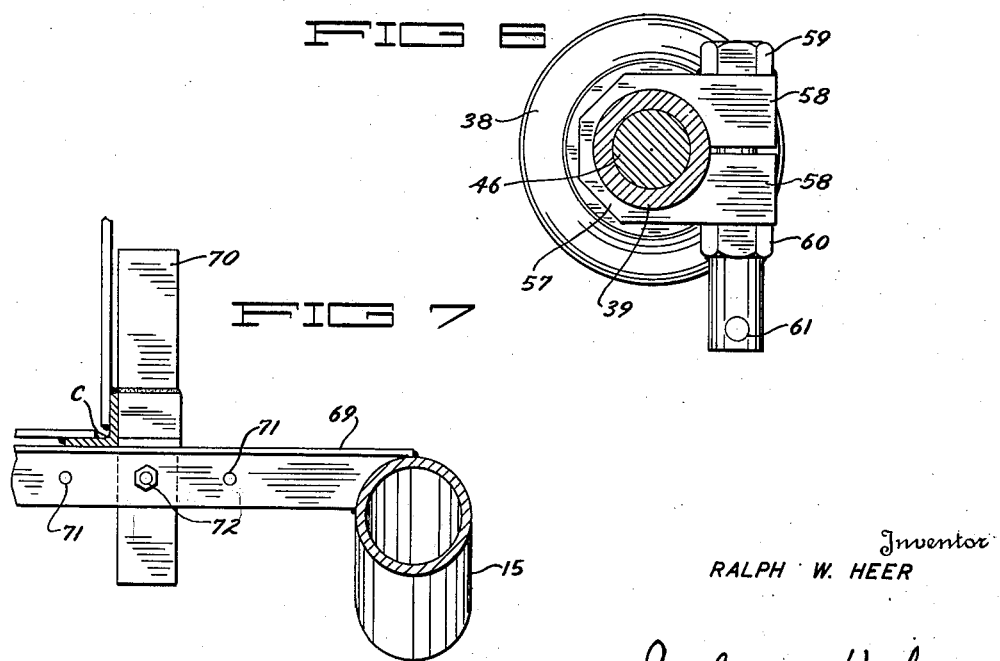
Inventor
RALPH W. HEER
By Carlsen & Hagle
Attorneys Patented Mar. 21, 1950

2,501,332

UNITED STATES PATENT OFFICE 2,501,332

CONVEYER SUPPORT AND TRANSPORT TRUCK

Ralph W. Heer, Minneapolis, Minn., assignor to Pioneer Engineering Works, Inc., Minneapolis, Minn., a corporation of Delaware Application April 12, 1946, Serial No. 661,650

12 Claims. (Cl. 198—233)

REISSUED
APR 10 1951
RE. 23354

1

This invention relates to improvements in trucks for supporting and transporting conveyors.

The type of conveyor here in mind is portable and has an elongated, comparatively narrow frame supporting an endless belt conveyor or the like, and which is used in many ways for moving materials about quarries, gravel pits and in mining operations. Such conveyors must frequently be moved about on the job or transported between jobs and for this purpose they are ordinarily assembled in connection with a wheeled supporting truck. Heretofore such trucks have had high towers and a relatively complex system of cables for supporting the conveyors and tilting them as required and this has led to much difficulty in transport, due to the high headroom required for the towers and the relative awkwardness and instability in general. Then too, such trucks are not adaptable to different conveyors and must be built up as an assembly with each conveyor, and are then not readily removable should the conveyor be more or less permanently installed on the job and the truck no longer needed.

Bearing in mind the foregoing, it is the primary object of my invention to provide a truck overcoming these difficulties and which is simple and compact, particularly as to height, and capable of being readily moved about to transport the conveyor from place to place along the highways. Another object is to provide a truck for this purpose which will fit conveyors of different sizes and may be readily attached to the conveyor, or removed when the conveyor reaches the job and is more or less permanently installed thereat. A further object is to provide a transport truck for conveyors which requires no high tower or overhead support and in which the primary support means for the conveyor are located in low positions and take the form of rigid booms or arms to provide the maximum of stability.

These and other more detailed and specific objects will be disclosed in the course of the following specification, reference being had to the accompanying drawings, in which—

Fig. 1 is a side view of my improved conveyor truck, showing a conveyor supported therein and adjusted to an operating position.

Fig. 2 is an enlarged, fragmentary detail sectional view showing the hydraulic ram means for adjusting the truck.

Fig. 3 is a plan view of the truck alone.

Fig. 4 is a side elevation, showing a part of the conveyor in dotted lines, and showing it supported in a transport position.

2

Fig. 5 is an enlarged sectional view taken substantially along the line 5—5 in Fig. 1 and showing the manner in which the conveyor is supported or cradled at that point, the conveyor frame being shown but the belt and rollers therefor being omitted.

Fig. 6 is a sectional view along the line 6—6 in Fig. 2.

Fig. 7 is an enlarged fragmentary sectional view along the line 7—7 in Fig. 4.

Referring now to the drawing more particularly and by reference characters, A designates generally a conveyor having an elongated frame of generally rectangular shape over and through which runs the usual conveyor belt B. The specific construction of the conveyor is of no importance to my invention, it being sufficient to note that the frame conventionally includes four longitudinally extended corner angles C suitably cross braced and trussed.

The support and transport truck comprises a three-sided or three-cornered frame structure arranged to support the conveyor and being itself wheel supported for transport purposes as will now be described. This frame structure is arranged at two corners to supportably engage and cradle the conveyor and at its remaining corner is supported upon a wheel borne axle.

This axle is indicated at 10 and at the ends thereof there are extended axle stubs 11—12 upon which rubber tired wheels 13—14 are rotatably mounted. One side of the said three sided frame structure comprises rigid arms 15—16 which are welded at one end at 17 to one side of the axle 10 and extend therefrom in one direction, parallel with the direction of travel and, as seen in Fig. 3, parallel to each other. These arms 15—16 are rigidly connected by cross braces 18 and at their distal ends, remote from the axle, they have apertured pivot lugs 19 which are pivotally engaged with pins 20—21 at the upper ends of a U-shaped yoke or cradle indicated generally at 22. This cradle comprises spaced cross members 23—24 from which upwardly extend converging sides 25 joined at upper ends by inner and outer plates 26—27 welded in place and supporting the aforesaid pins 20—21. The arrangement is obviously such that the cradle will hang by the pins 20—21 from the ends of the arms 15—16. Joining the sides 25 above the cross members 23—24 are support angles 28 welded in place and attached at its ends thereto by bolts 29 is an upper cross member or hold down member 30. Another side of the frame structure comprises extensible arms or booms 31—32 connected by hydraulic plungers or rams to pivot lugs 33 on the axle 10 and extending therefrom in a direction opposite that of the arms 15—16. Th distal ends of these arms 31—32, remote from the axle, also have pivot lugs 34 by which they are pivotally attached to pins 35 extending from the ends of a cross member 36. The arms 31—32 are rigidly connected and trussed by cross braces 37 as seen in Fig. 3. At their ends adjacent the axle 10 the arms 31 and 32, which are tubular as seen in Fig. 2, each has an end cap or collar 38 which is centrally apertured to nicely and slidably fit over a tubular ram cylinder 39 the exposed end of which is closed by an end plug 40 welded to the cylinder at 41 and apertured to pivotally engage a pin 42 carried by the aforesaid lugs 33. Within the associated arm the cylinder 39 has an enlarged fitting 43 welded to its end at 44 and the outer diameter of this part is such as to slidably fit the bore 45 in the arm. A plunger 46 is slidably mounted in the cylinder 39 and extends out through a gland or packing assembly 47 in the fitting 43, and the extended end of the plunger is rounded off at 48 to bear in a socket 49 formed in a cross member 50 secured within the bore 45 in the arm in any suitable manner. The plunger end enclosed in the cylinder 39 has a head ring 51 nicely fitting the cylinder bore 52.

A conventional, commercially available type of hydraulic hand pump D is secured upon the axle 10 near one end and flexible lines or hoses 53—54 run from this pump to fittings 55 upon the plugs 40 for the respective arms 31 and 32. Ducts 56 (Fig. 2) connect the fittings 55 to the bores 52 of the respective cylinders 39 and the arrangement is obviously such that operation of the pump D to force fluid under pressure through the fittings 55 and ducts 56 into the cylinders 39 will project the plungers 46 from the cylinders 39 and the ends of the plungers, by engaging the cross member 50, will project the arms 31—32 away from the axle 10 to thus effectively extend the length of the arms. Operation of the pump assembly to permit return flow of the fluid will, as will be readily understood, allow the arms to collapse or be reduced in effective length.

Split collars 57 are fitted over each cylinder 39 and may be clamped about the cylinder by drawing their end lugs 58 together by bolts 59 the nuts 60 of which are fitted with handles 61. When the arms 31—32 are adjusted to desired length the collars 57 are adjusted against the caps 38 and tightened to thus hold the arms in adjustment and relieve the hydraulic system of the load.

The remaining side of the three-sided frame structure comprises a pair of cables 62—63 stretched between the ends of the arms 15—16 and 31—32 remote from the axle 10 and connected thereto by clevis members or link coup'ings 64 to the pins 20—21 and 35. Turnbuckles 65 are provided in the cables to adjust their length and properly angle the frame sides with respect to each other.

To arrange the conveyor A upon the truck thus formed the hold down member 30 is removed and the conveyor placed upon the cross members 23, 24 and 36, being then supported by these members at widely spaced points along its length and projecting at each end beyond the truck frame. To hold the conveyor against displacement hook bolts 66 (Fig. 5) are passed downwardly through the cross members 23—24 and 36 and hooked over the lower corner angles C and are drawn tight. The hold down member 30 is then replaced and hook bolts 67 fastened through it and hooked under the upper corner angles C of the conveyor, completing the mounting.

In operation, then, with the arms 31—32 collapsed or telescoped to minimum length and the cables 62—63 properly adjusted the conveyor A will be supported in a substantially horizontal lowered position (Fig. 4) and nicely balanced upon the wheels 13—14 so that it may be readily transported along the highways. Attention is called to the fact that in this position the conveyor is low slung with no high parts to cause headroom difficulties during transport. When the conveyor reaches the job the pump D is actuated to extend the arms 31—32 and this extension of the arms thrusts the adjacent end of the conveyor upwardly, tilting the entire assembly about the axis of the truck wheels to the operating position of Fig. 1. It will be noted that in this position, if the conveyor is supported at its elevated end, as it will be when more or less permanently installed on the job, the truck may be readily detached and run out to the right (Fig. 1) from beneath the conveyor for use on other conveyors. When the conveyor is in working position the collar 57 may be used to lock the arms and relieve the hydraulic system of strain.

It will be apparent from the foregoing that with my truck the conveyor may be readily transported from place to place and adjusted to any desired position for either transport or work by a single operator manipulating the hand pump D.

An important feature of my invention resides in the ease with which a conveyor may be placed in the truck or removed therefrom thus making it possible for the manufacturer to make trucks and trailers separately and supply trucks only when called for by the user. Since conveyors are ordinarily made in several standard widths the cross members 23, 24, 30 and 36 are provided with series of transversely spaced openings 68 for the bolts 66 and 67 to thus accommodate different conveyor widths. Thus the truck is made more universal in its application.

While in transport the conveyor is laterally engaged between the widely spaced supports or cradles to overcome any tendency of the conveyor, which is somewhat limber, from weaving or swaying. For this purpose I provide a cross member 69 connecting the arms 15 and 16 adjacent the axle ends thereof and upon this cross member secure upright, upwardly projecting finger members 70 between which, and upon the cross member 69, the lower corner angles C of the conveyor will drop when it is lowered to transport position as seen in Figs. 4 and 7. Three openings 71 are provided for the fastening bolts 72 of the finger members 70 to accommodate them to standard conveyor widths. This structure obviously also provides three point upward support for the conveyor in transport position preventing weaving in any direction.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a truck for temporarily supporting and transporting a conveyor, a frame structure comprising a wheel borne axle and arms extending in opposite directions therefrom and having means adjacent their ends for upwardly and supportably engaging the conveyor at widely spaced points along its length, means connecting the arms together to support the weight of the conveyor and forming a substantially triangular frame, means for extending one of the arms for raising the conveyor from a transport position to a tilted operating position and return, and means on at least one of the arms for both upwardly and laterally engaging the conveyor between the said widely spaced support points when the extensible arm is retracted to present the frame structure in transport position.

2. In a conveyor truck of the character described, a wheel borne axle, separate pairs of arms extending in opposite directions forwardly and rearwardly from the axle and adapted at their opposite ends for connection to the conveyor, cables connecting said opposite ends of the arms, and one of the said pairs of arms being pivotally connected to the axle and embodying hydraulic plunger means for extending the arms to adjust the angle and elevation of the conveyor.

3. In a conveyor supporting and transporting truck of the character described, a wheel borne axle, separate arm members extending in opposite directions from the axle and having means for engaging the conveyor and supporting it crosswise to and above the axle, means connecting the arm members to hold them against relative spreading movement under the weight of the conveyor, one of said arms including fluid actuated plunger means for adjusting the length of the arm member and positioning the conveyor, and a clamp member associated with said arm member to lock it in adjusted positions and relieve said plunger means of the load.

4. In a conveyor supporting and transporting truck of the character described, a wheel borne axle, a first pair of arms connected at one end to the axle and extending therefrom in the direction of travel, a cross member connecting said arms to upwardly engage the bottom of the conveyor, a second pair of arms connected at one end to the axle and extending therefrom in a direction opposite the first pair, a cradle member suspended from the ends of the second pair of arms and having transversely extending cross members for upwardly and supportably engaging the conveyor, cables connected between the ends of the arms, and means for adjusting the length of the first pair of arms for elevating the adjacent end of the conveyor while tilting it about the axis of the wheels.

5. In a conveyor supporting and transporting truck of the character described, a wheel borne axle, a first pair of arms connected at one end to the axle and extending therefrom in the direction of travel, a cross member connecting said arms to upwardly engage the bottom of the conveyor, a second pair of arms connected at one end to the axle and extending therefrom in a direction opposite the first pair, a cradle member suspended from the ends of the second pair of arms and having transversely extending cross members for upwardly and supportably engaging the conveyor, cables connected between the ends of the arms, means for adjusting the length of the first pair of arms for elevating the adjacent end of the conveyor while tilting it about the axis of the wheels, and the said cross members having means for fastening to and adjustment for conveyors of different widths.

6. In a conveyor supporting and transporting truck of the character described, a wheel borne axle, a first pair of arms connected at one end to the axle and extending therefrom in one direction to a point below the conveyor and there having a cross member for upwardly engaging the conveyor, a second pair of arms also connected at one end to the axle and extending therefrom in a direction opposite the first pair of arms and terminating above the conveyor, a cradle device having means for supporting the conveyor and upwardly turned side portions suspended from the ends of the second pair of arms, cables connecting the ends of the arms of each pair, and means for adjusting the length of one pair of the arms and raising and lowering the conveyor.

7. In a conveyor supporting and transporting truck of the character described, a wheel borne axle, a first pair of arms connected at one end to the axle and extending therefrom in one direction to a point below the conveyor and there having a cross member for upwardly engaging the conveyor, a second pair of arms also connected at one end to the axle and extending therefrom in a direction opposite the first pair of arms and terminating above the conveyor, a cradle device having means for supporting the conveyor and upwardly turned side portions suspended from the ends of the second pair of arms, cables connecting the ends of the arms of each pair, means for adjusting the length of one of said pairs of arms and raising and lowering the conveyor, and a cross member connected to the cradle device and adapted to downwardly engage the conveyor to hold it down upon said supporting means.

8. In a truck for supporting and transporting a conveyor of the character described, a frame structure comprising a wheel borne axle and arms extending in opposite directions therefrom and having means adjacent their ends for upwardly and supportably engaging the conveyor at widely spaced points along its length, flexible means connecting the arms together to support the weight of the conveyor, fluid actuated means for extending one of said arms to raise and lower the conveyor and a hand pump supported upon the axle for supplying fluid for actuation of said means.

9. A supporting and transporting truck for a conveyor, comprising a wheel supported axle, a three-sided frame structure including a pair of widely diverging arm assemblies connected at widely spread ends by non-extensible members separate from the conveyor and having their other ends extended to and supported on the axle, means at the widely spread ends of the arm assemblies for supporting the conveyor, means for adjusting one of said arm assemblies to adjust the conveyor from a lowered transport position to an elevated and tilted working position, and means carried by one of said arm assemblies for laterally engaging the conveyor in and near its transport position at a point between the widely spread ends of the arm assemblies.

10. A truck of the character described for supporting and transporting a conveyor, comprising in combination, a wheel supported axle, arms extending in opposite directions from the axle, means at the spread ends of the arms for detachably engaging the conveyor at spaced points along the length thereof, flexible and non-extensible connections between the said spread ends of the arms, and means for adjusting the length of the arms to one side of the axle to raise and lower the conveyor.

11. In a truck for supporting and transporting a conveyor, a frame structure comprising a wheel borne support and arms extending in opposite directions therefrom and adapted at their spread ends for connection to the conveyor, cable means connecting the arms together to support the weight of the conveyor, fluid actuated means for extending one of said arms to raise and lower the conveyor, and a hand pump on said frame structure for supplying fluid for actuating said means.

12. A truck of the character described for supporting and transporting a conveyor, comprising in combination, a frame structure having a wheel supported axle member, arms extending in opposite directions from the axle member, and having means at their spread ends for detachably engaging the conveyor at spaced points along its length, flexible cable means connecting the spread ends of the arms, means for adjusting the length of the arms on one side of the axle to raise and lower the conveyor, and means on said frame structure for supportably engaging the conveyor in its lowered position and between the spread ends of the arms.

RALPH W. HEER.

REFERENCES CITED

The following references are of record in the file of this patent:

UNITED STATES PATENTS

| Number | Name | Date |
|---|---|---|
| 284,234 | Reeves et al. | Sept. 4, 1883 |
| 1,520,332 | Connolly | Dec. 23, 1924 |
| 1,784,872 | Hartman | Dec. 16, 1930 |
| 1,808,237 | Liggett | June 2, 1931 |
| 1,950,506 | McLaughlin | Mar. 13, 1934 |
| 2,251,667 | Ehinger | Aug. 5, 1941 |
| 2,404,898 | Aycock | July 30, 1946 |

FOREIGN PATENTS

| Number | Country | Date |
|---|---|---|
| 650,030 | Germany | Sept. 9, 1937 |